United States Patent [19]
Zimmer

[11] Patent Number: 5,940,587
[45] Date of Patent: Aug. 17, 1999

[54] SYSTEM AND METHOD FOR TRAP ADDRESS MAPPING FOR FAULT ISOLATION

[75] Inventor: Vincent J. Zimmer, Federal Way, Wash.

[73] Assignee: Intel Corporation, Santa Clara, Calif.

[21] Appl. No.: 08/989,421

[22] Filed: Dec. 12, 1997

[51] Int. Cl.$^6$ .................................................. G06F 11/00
[52] U.S. Cl. ..................... 395/183.01; 395/591; 711/202
[58] Field of Search .......... 395/183.01, 183.21, 395/387, 568, 591, 733, 741, 742; 711/202, 209, 212, 220, 221

[56] References Cited

U.S. PATENT DOCUMENTS

| | | | |
|---|---|---|---|
| 5,109,334 | 4/1992 | Kamuro | 395/400 |
| 5,125,087 | 6/1992 | Randell | 395/425 |
| 5,175,847 | 12/1992 | Mellott | 395/575 |
| 5,418,956 | 5/1995 | Willman | 395/700 |
| 5,561,788 | 10/1996 | Letwin | 395/500 |
| 5,692,170 | 11/1997 | Isaman | 395/591 |
| 5,715,420 | 2/1998 | Kahle et al. | 395/416 |
| 5,784,550 | 7/1998 | Brockmann et al. | 395/183.09 |
| 5,812,868 | 9/1998 | Moyer et al. | 395/800.23 |

*Primary Examiner*—Joseph E. Palys
*Attorney, Agent, or Firm*—Blakely, Sokoloff, Taylor & Zafman

[57] ABSTRACT

The invention relates to the alteration of a segment and an offset used to form an effective address of the default interrupt handler routine. The method comprising a number of steps. First, a trap address of a default interrupt handler routine is provided. This trap address includes a segment and an offset normally used to calculate the effective address via conventional circuitry. However, an unique segment is produced by performing an arithmetic operation on the segment. Thereafter, another arithmetic operation is performed to produce a unique segment. These unique segment and offset values may still be used by the conventional circuitry to still produce the same effective addresses so that only one default interrupt handler routine is required. While this alteration produces a unique segment and offset which can be assigned to an interrupt, the segment and offset are modified appropriately to still use a common default interrupt handler.

21 Claims, 4 Drawing Sheets

SYSTEM AND METHOD FOR TRAP ADDRESS MAPPING FOR FAULT ISOLATION

BACKGROUND OF THE INVENTION

1. Field of the Invention

The present invention relates to the field of fault handling. More particularly, the present invention relates to a system and method for ascertaining an origin of a fault condition through manipulation of segment and offset used to calculate an effective address.

2. Description of Art Related to the Invention

For many years, interrupt handling of an electronic system has been accomplished through the use of an interrupt vector table (IVT) generated by system Basic Input/Output System (BIOS) firmware. An IVT usually features a number of entries (e.g., 256 four-byte entries), each capable of containing an address of a routine intended to handle interrupts. At start-up, system software usually loads an identical address into each entry of the IVT. This address is directed to a default interrupt handler routine responsible for handling interrupts anticipated to occur during initialization (e.g., a hard disk interrupt, timer interrupt, non-maskable interrupt "NMI", software invoked interrupts such as trap instructions, etc.). However, this interrupt handling technique does not effectively account for an unexpected (spurious) interrupt (referred to as a "fault condition") caused by either hardware or software.

Currently, upon experiencing a fault condition, the default interrupt handler routine is accessed. Unfortunately, the default interrupt handler routine is only able to determine whether or not the interrupt is associated with a predetermined set of external interrupts (e.g., a hard disk interrupt, a timer error, a NMI, etc.) supported by one or more programmable interrupt controllers (PICs) such as INTEL®8259 controllers. Such determination is accomplished by checking the state of various logic circuitry (e.g., latches, etc.) associated with the PIC(s).

If the fault condition is based on any of the predetermined set of interrupts, a number assigned to that interrupt is loaded into a status register. Thus, the content of the status register indicates the cause of the fault condition. Otherwise, a null value is loaded into the status register which offers no indication of the cause of the fault condition. As a result, the origin of a fault condition is rarely ascertained since only fifteen types of interrupts can be detected by the current IVT.

Of course, it is possible to develop an interrupt handling mechanism in which each entry of the IV is loaded with an address of a unique interrupt handling routine. This may be a possible solution if strict memory size constraints did not apply. However, since BIOS only has a limited amount of available code space and supports IVT during and after initialization, system performance would be unnecessarily sacrificed to substitute run-time code in BIOS for fault handling code which is rarely used.

SUMMARY OF THE INVENTION

One embodiment of the invention pertains to a method for producing an effective address. The method comprise a number of steps. An address of a software routine is provided. This address includes a segment and an offset used to calculate an effective address of the software routine. An unique segment is produced by performing an arithmetic operation on the segment. Another arithmetic operation is performed to produce a unique offset. While both the segment and offset have been modified, the effective address remains unchanged.

BRIEF DESCRIPTION OF THE DRAWINGS

The features and advantages of the present invention will become apparent from the following detailed description of the present invention in which.

DESCRIPTION OF THE PREFERRED EMBODIMENT

Embodiments of the present invention relates to a system and method for ascertaining an origin of a fault condition by modifying a segment and an offset used to form an effective address of an interrupt handling routine without altering the effective address.

In the following description, some terminology is used to generally describe certain features or characteristics of the present invention. For example, an "electronic system" may include a computer (e.g., a portable, desktop, server, mainframe, etc.) or any other hardware equipment supporting interrupt handling. "Information" is generally defined as a signal of one or more bits of (i) data, (ii) address, and/or (iii) control. An "interconnect" is any medium used to transfer information from a source to a destination such as one or more wires, buses, trace lines or fiber optics as well as wireless medium. A "system executive" is a software agent that provides an intermediary software control layer between hardware and a software application. Examples of a system executive include, but are not limited to an operating system or Basic Input/Output System (BIOS).

Figure 1:
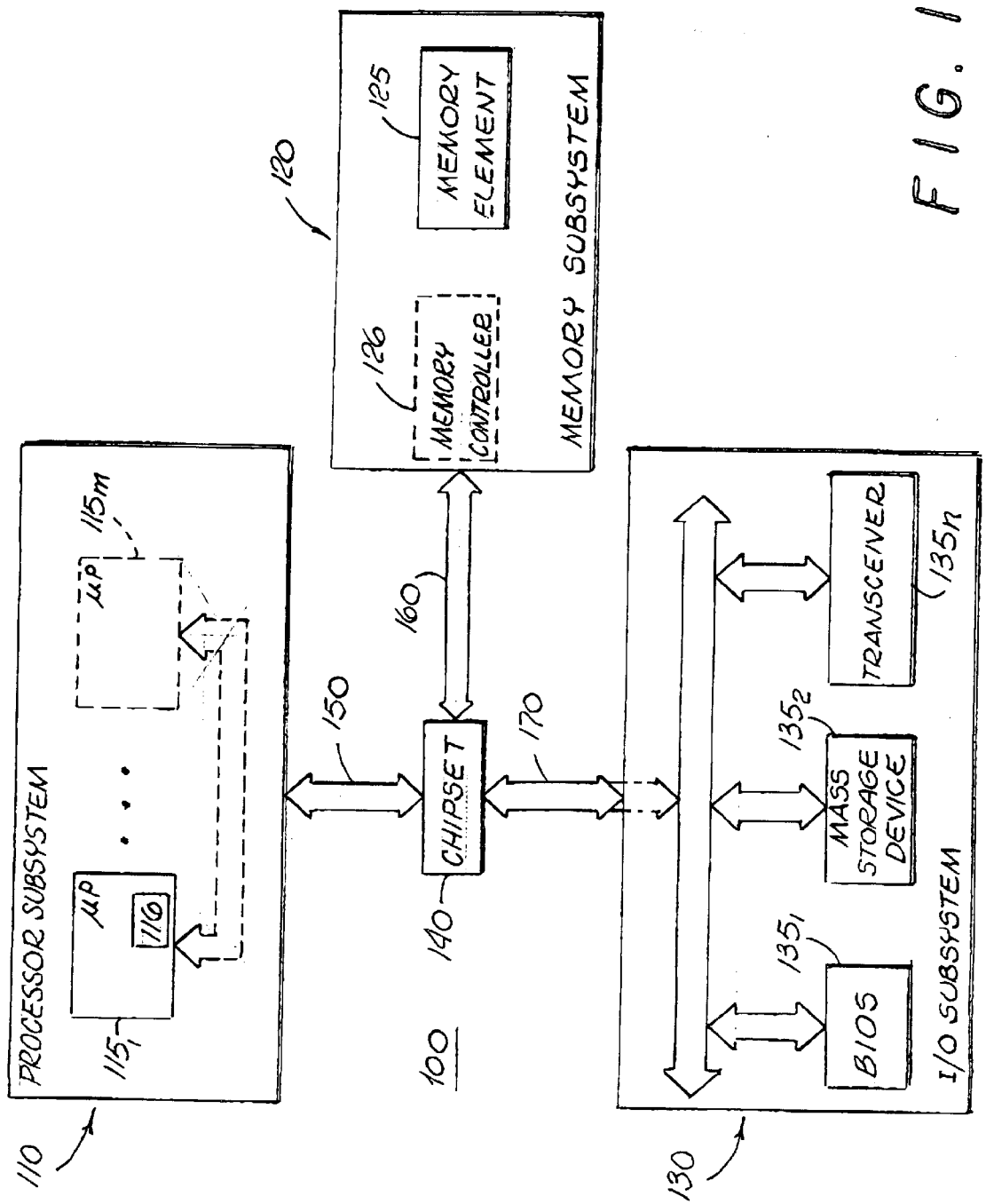
FIG. 1 is an illustrative block diagram of an embodiment of an electronic system utilizing the present invention.

Referring now to FIG. 1, an illustrative embodiment of an electronic system 100 employing the present invention is shown. In this embodiment, electronic system 100 comprises a processor subsystem 110, a memory subsystem 120 and an input/output (I/O) subsystem 130. These subsystems are connected together through a chipset 140 and a number of interconnects such as a host interconnect 150, a memory interconnect 160 and an I/O interconnect 170.

Processor subsystem 110 includes one or more microprocessors $115_1$–$115_m$ ("m" is a positive whole number) connected to host interconnect 150. Each microprocessor, for example microprocessor ($\mu P$) $115_1$, includes a code segment (CS) storage element 116. Normally, CS storage element 116 is a 16-bit register which contains a segment. A "segment", in this context, is a portion of the starting address of a predetermined block of memory containing information such as an interrupt vector table (IVT) 200 of FIG. 2. It is contemplated, however, that CS storage element 116 may be configured to be a storage device of any size.

Memory subsystem 120 is connected to chipset 140 via memory interconnect 160 and includes at least one memory element 125. Preferably, memory element 125 is a volatile memory such as dynamic random access memory (DRAM)

capable of loading a system executive such as an operating system such as a Windows™-based operating system produced by Microsoft Corporation of Redmond, Wash. It is contemplated, however, that non-volatile memory (e.g., any type of read only memory "ROM", FLASH memory and the like) may be used as memory element 125 in lieu of volatile memory. Of course, it is contemplated that a memory controller 126 may be implemented within memory subsystem 120.

The I/O interconnect 170 provides a communication path between a plurality of peripheral devices $135_1$–$135_n$ ("n" being a positive whole number) contained in I/O subsystem 130. The I/O interconnect 170 may be a Peripheral Component Interconnect (PCI) bus, Industry Standard Architecture (ISA) bus or any other type of bus architecture. It is contemplated that I/O interconnect 170 is shown as a single bus, although it may include multiple buses connected together through bridge circuitry in which each peripheral device $135_1$–$135_n$ is connected to at least one of the multiple buses. One peripheral device $135_1$ is a non-volatile storage element which contains another system executive, namely a Basic Input/Output System (BIOS) code. Other peripheral devices may include, but are not limited or restricted to a mass storage device $135_2$ (e.g., a hard disk drive, a compact disc-read only memory "CD-ROM" player, CD recordable player, digital tape drive, a floppy disk drive, a digital video disk player, etc.), a transceiver device $135_n$ (e.g., a network interface circuit "NIC" card, a modem, etc.) and the like.

Figure 2:
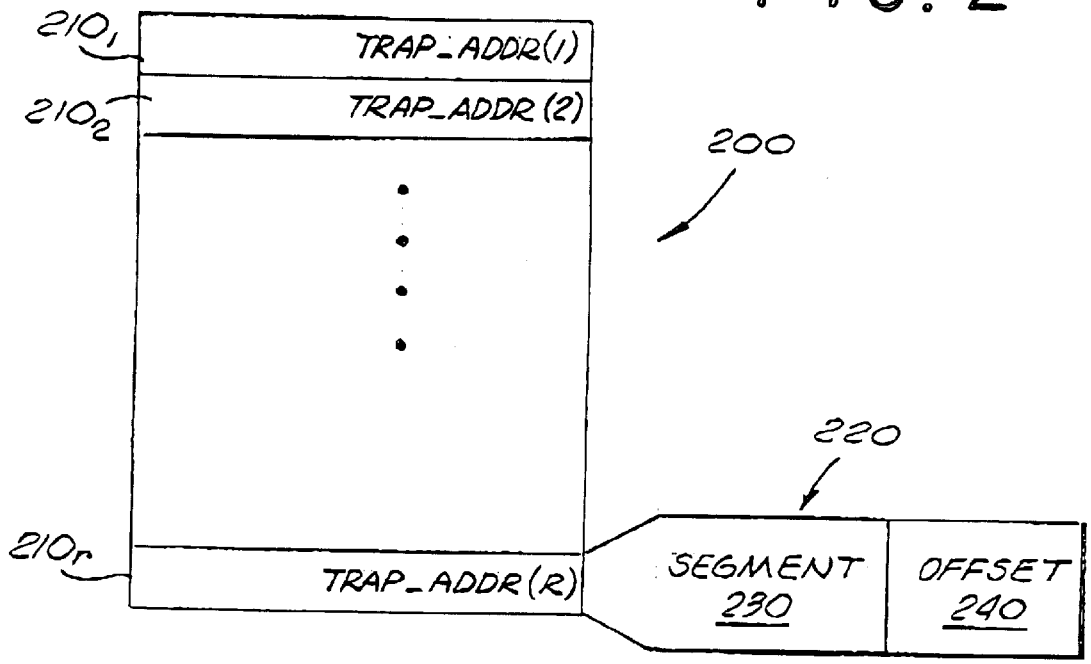
FIG. 2 is an illustrative block diagram of an embodiment of an interrupt vector table (IVT) capable of being produced by a system executive such as BIOS firmware.

Referring now to FIG. 2, IVT 200 produced by a system executive (e.g., BIOS) in accordance with the present invention is shown. IVT 200 is a table featuring a plurality of entries $210_1$–$210_r$ ("r" being a positive whole number). Each entry corresponds to an interrupt supported by electronic system 100. As shown, each entry $210_1$–$210_r$ is responsible for providing a trap address to a microprocessor (e.g., microprocessor $115_1$ of FIG. 1). The trap address 220 includes a segment 230 and an offset 240 which, when combined, produce an effective, physical address of a default interrupt handler routine to be fetched from memory element 125 of FIG. 1.

Figure 3:
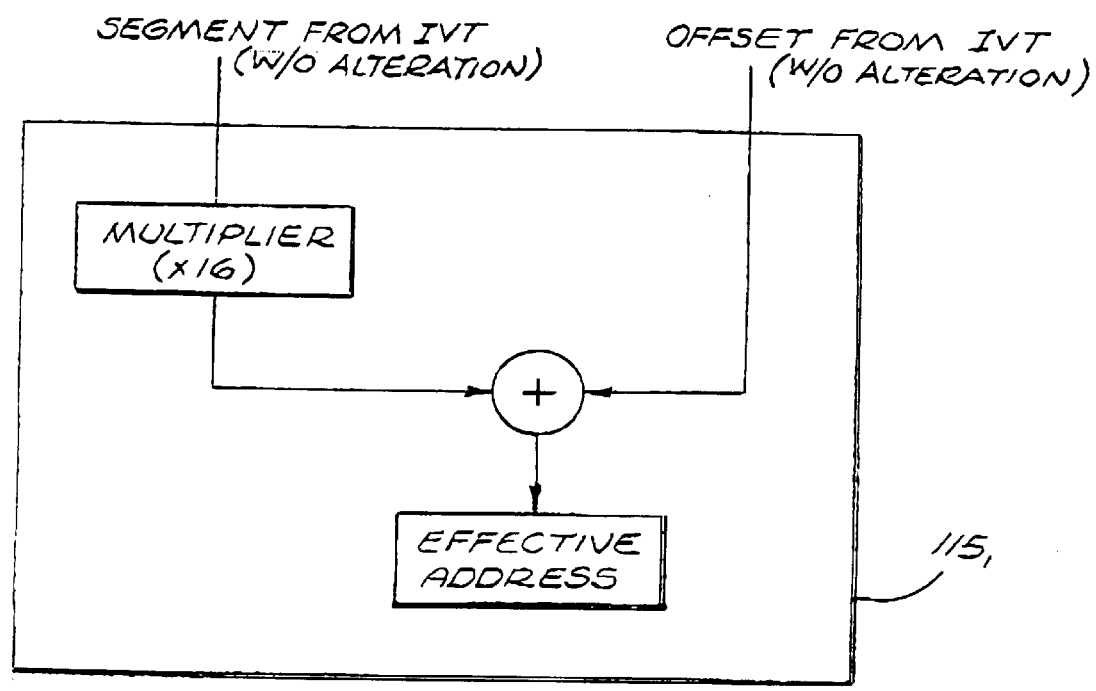
FIG. 3 is a block diagram of the conventional operation in calculating the effective address.

As shown in FIG. 3, for INTEL® microprocessor architectures, other compatible architectures, and even other products the effective address associated with the default interrupt handler routine is calculated by microprocessor $115_1$ of FIG. 1 retrieving segment 230 of trap address 220. The segment 230 is multiplied by sixteen (16) and added to offset 240 obtained from trap address 220. The resultant sum is equal to the effective address of the default interrupt handler routine as defined by the first equation:

(1) Effective Address=Segment(routine)×16+Offset(routine).

Since the effective address is dependent on the segment and offset, concurrent adjustment of both the segment and the offset may be performed without modifying the effective address. It is the manipulation of these factors forming the effective address which can provide a mechanism to indicate the origins of a wide variety of fault conditions, without employing multiple default interrupt handler routines.

Figure 4:
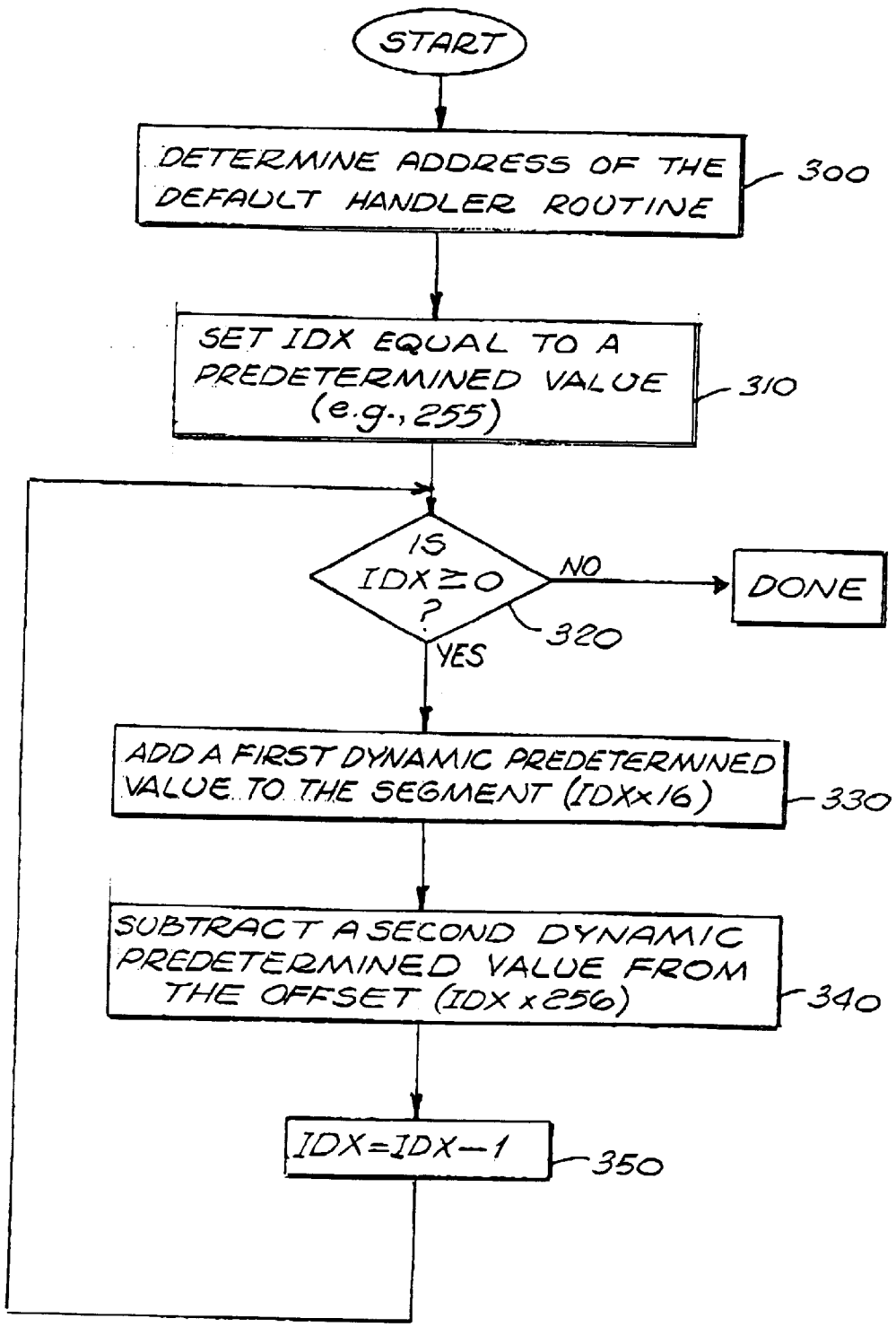
FIG. 4 is an illustrative flowchart of the operational steps employed to produce the IVT of FIG. 2.

Referring to FIG. 4, a flowchart illustrating one technique for preparation of the IVT of FIG. 2 is shown. Initially, an address of the default interrupt handler routine is determined because this address is well-known to all procedures within the system executive as well as any sub-routines linked to the system executive in this embodiment. In particular, early initialization code (used to set up the IVT) has access to the address of the default interrupt handler routine in order to form permuted versions of that address (300). For clarity, this address assigned to the default interrupt handler routine is referenced as trap address "TRAP_ADDR."

Next, an index parameter (referred to as "IDX") is initially set to a predetermined value (310). This predetermined value represents an entry number from which indexing of the entries of the IVT begins. This predetermined value is (i) checked to ensure that it still remains in a given range equivalent to the number of entries of the IVT and (ii) modified (i.e., incremented or decremented) after altering the segment and offset stored in the particular indexed entry (320 and 350). As a result, IDX operates as a counter.

Before the predetermined value of IDX is modified, the TRAP_ADDR contained in the indexed entry of the IVT 200 of FIG. 2 is altered by adding a first dynamic, predetermined value to a first portion of TRAP_ADDR and subtracting a second predetermined value from a second portion of TRAP_ADDR (330 and 340). In particular, the first portion (e.g., the segment) is altered to produce a unique value by adding a dynamic value (IDX×16) to its current value. As a result, in this embodiment the contents of each entry of the IVT differs from the contents of other entries because IDX is unique for each entry. As a result, the first calculation of the unique segment starting at the first byte of a four-byte entry may be represented by the second equation:

(2) MEM[IDX×4+0]=SEG(TRAP_ADDR)+(IDX×16).

Next, the second portion (e.g., the offset) is altered in this embodiment to counteract the effects from altering the segment. This ensures that the effective address remains constant without modification of internal calculations (see first equation) to produce the effective address of the default interrupt handling routine. In accordance with the embodiment described above, the unique offset would be reduced by IDX×256 because a four-bit shift of the segment (effectively a 20-bit value) would be tantamount to a 8-bit shift in the offset (effectively a 16-bit value). The calculation of the unique offset starting at the third byte of the entry is shown in the third equation:

(3) MEM[IDX×4+2]=OFFSET(TRAP_ADDR)−(IDX×256).

Figure 5:
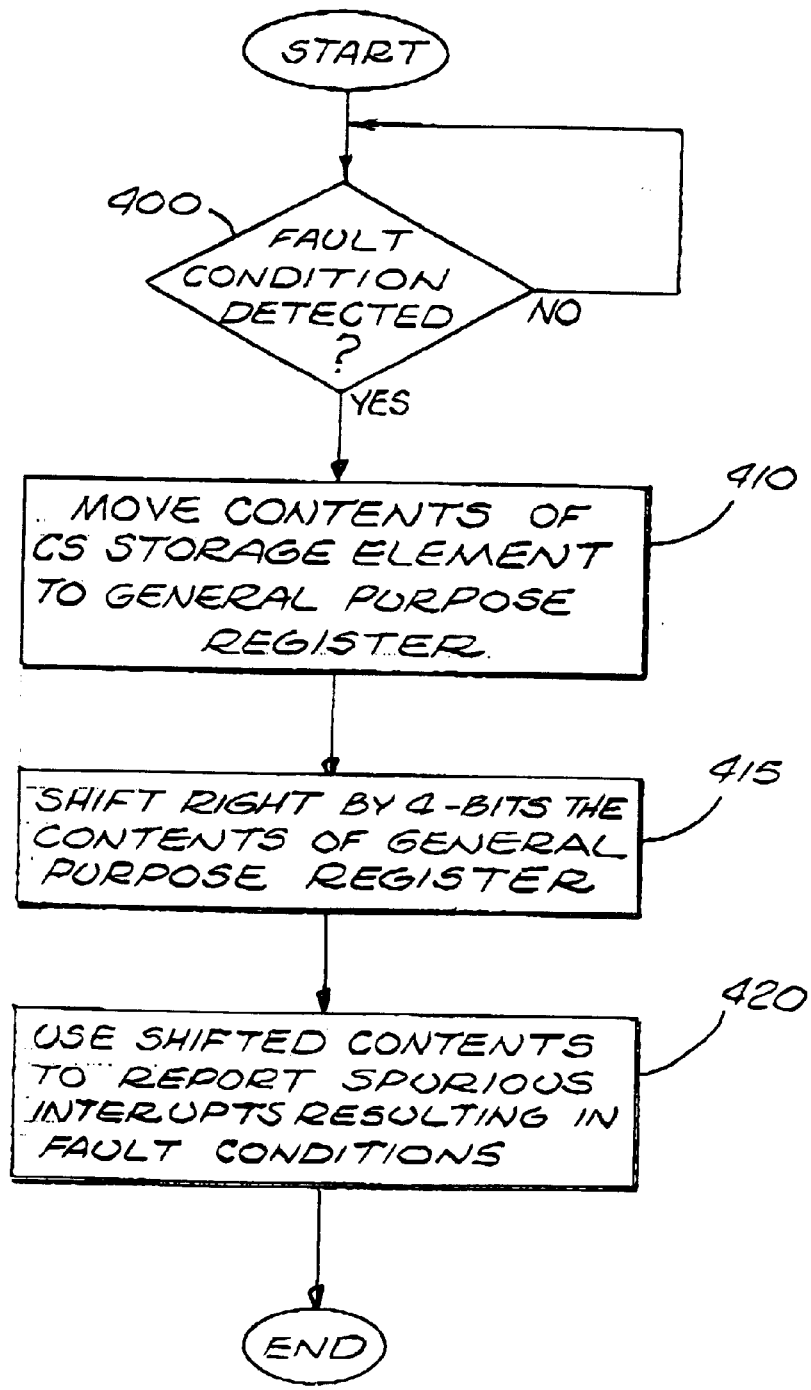
FIG. 5 is an illustrative flowchart of the operational steps to produce a unique segment address of the default interrupt handler routine of the electronic system of FIG. 1.

Referring now to FIG. 5, the processing operations for a fault condition is shown. Upon detecting a fault condition (e.g., an unexpected interrupt), the contents of the CS storage element is moved into a general purpose register (400 and 410). Thereafter, the contents now contained in the general purpose register are shifted to the right by four bits (415). This is desired to produce an index which has a 1:1 mapping with the IVT entry that caused the spurious interrupt.

More specifically, an illustrative range of input interrupts features 256 interrupts which can be encoded using a 8-bit value (0 to 255). By shifting right by 4, we conveniently align the IVT offset entry into the least significant byte of the CS register. Thus, the shift right normalizes TRAP_ADDRESS to an 8-bit number which uniquely represents a spurious interrupt. This 8-bit number may be utilized by a traditional "Port 80h" card during testing of the electronic system.

The "Port 80h" cards are currently used by PC manufacturers and PC BIOS vendors to check progression of the power-on self test (POST) operations. Each task in POST is assigned a code value, namely a 8-bit value, written to a particular I/O address (e.g., I/O location 80h where "h" indicates a hexadecimal number) immediately prior to executing a POST task. In addition, each input interrupt may be written to the particular I/O address to monitor input interrupts during testing of the electronic system. Thus, on system failure prior to an OS boot, the last code signal value issued to the system can be examined as well as the spurious interrupt. Besides Port 80h cards, spurious errors may be reported through many other types of reporting mechanisms such as, for example, storing the code value into a history log in non-volatile memory and/or elements of the system memory data structure (e.g., BIOS Data Area "BDA" typically at physical address 0×400) as shown in 420.

While various embodiments of the invention have been described, those skilled in the art will realize that other embodiments of the invention are easily foreseeable without departing from the spirit and scope of the present invention. Moreover, well known circuitry and operational steps are not set forth in detail in order to avoid unnecessarily obscuring the present invention. The invention should, therefore, be measured in terms of the following claims.

What is claimed is:

1. In an electronic system, a method comprising the steps of:
   providing an address of a software routine used at least during start-up of the electronic system, the address including a segment and an offset used to calculate an effective address of the software routine;
   performing an operation on the segment to produce a unique segment differing from the segment by a first signal value; and
   performing an operation on the offset to produce a unique offset differing from the offset by a second signal value, being a factor of the first signal value, so that the effective address remains unchanged.

2. The method of claim 1, wherein the step of performing the arithmetic operation on the segment includes the steps of:
   multiplying together a dynamic signal value and a first static signal value to calculate the first signal value; and
   adding the first signal value to the segment to produce the unique segment.

3. The method of claim 2, wherein the dynamic signal value is an index value indicating an entry of an interrupt vector table containing the address.

4. The method of claim 3, wherein the first static signal value is equal to a binary representation of sixteen.

5. The method of claim 2, wherein the step of performing the operation on the offset includes the steps of:
   multiplying together the dynamic signal value and a second static signal value to calculate the second number; and
   subtracting the second signal value from the offset to produce the unique offset.

6. The method of claim 5, wherein the dynamic signal value is an index value indicating an entry of an interrupt vector table containing the address.

7. The method of claim 6, wherein the second static signal value is equal to two-hundred and fifty-six.

8. The method of claim 1, wherein the software routine comprises a default interrupt handler routine.

9. In an electronic system, a method comprising:
   providing an address of a software routine used at least during start-up of an electronic system, the address including a segment and an offset used to calculate an effective address of the software routine;
   adding a first signal value to the segment to produce a unique segment; and
   subtracting a second signal value from the offset to produce a unique offset, the second signal value being a factor of the first signal value so that the effective address remains unchanged.

10. The method of claim 9, wherein the adding operation includes multiplying a dynamic signal value and a first static signal value to produce the first signal value.

11. The method of claim 10, wherein the dynamic signal value is an index value indicating an entry of an interrupt vector table containing the address.

12. The method of claim 11, wherein the static signal value is equal to a binary representation of sixteen.

13. The method of claim 10, wherein the subtracting step includes the step of multiplying the dynamic signal value and a second static signal value to produce the second signal value.

14. The method of claim 13, wherein the dynamic signal value is an index value indicating an entry of an interrupt vector table containing the address.

15. The method of claim 14, wherein the second static signal value is equal to two-hundred and fifty-six.

16. A system comprising:
   a storage element; and
   a microprocessor in communication with the storage element, the microprocessor is capable of processing a system executive contained in the storage element to produce an interrupt vector table, each entry of the interrupt vector table including an address with a segment and an offset, both of which are capable of being used to calculate an effective address of a default interrupt handler routine, each segment increasing from an original segment value by a first unique value while the corresponding offset decreasing from an original offset value by a second unique value being a factor of the first unique value so that the effective address of the default interrupt routine remains unchanged.

17. The system of claim 16, wherein the storage element comprises a non-volatile memory element containing the system executive including one of an operating system and a basic input/output system (BIOS) code.

18. A system for mapping trap addresses produced by code stored on a computer-readable medium and executed by a computer, comprising:
   a first module adapted to modifying a first portion of an address of a default interrupt handler routine; and
   a second module adapted to modify a second portion of the address of the default interrupt handler routine to counteract the effects in modifying the first portion of the address.

19. The system of claim 18, wherein the first module dynamically modified a segment of the address of the default interrupt handler routine.

20. The system of claim 19, wherein the second module modified an offset of the address in accordance with a value to counteract a modification of the segment of the address.

21. In an electronic system, a method comprising
   providing an address of a software routine used during start-up of the electronic system, the address including a segment and an offset, both of which are used to calculate an effective address of the software routine;
   performing an operation on the segment to produce a unique segment, the unique segment differing from the segment by a first signal value; and
   performing an operation on the offset to produce a unique offset, the unique offset differing from the offset by a second signal value, being a factor of the first signal value, so that the effective address remains unchanged.

\* \* \* \* \*

UNITED STATES PATENT AND TRADEMARK OFFICE
CERTIFICATE OF CORRECTION

PATENT NO.    : 5,940,587
DATED         : August 17, 1999
INVENTOR(S)   : Zimmer It is certified that error appears in the above-identified patent and that said Letters Patent is hereby corrected as shown below:

Column 1,
Line 50, delete "IV" and insert -- IVT --.

Signed and Sealed this

Twenty-ninth Day of April, 2003

JAMES E. ROGAN
*Director of the United States Patent and Trademark Office*